Patented Feb. 2, 1954

2,668,171

UNITED STATES PATENT OFFICE 2,668,171

PROCESS FOR MANUFACTURING COPPER PHTHALOCYANINE

John Denny Compton, New Castle County, Del., assignor to E. I. du Pont de Nemours and Company, Wilmington, Del., a corporation of Delaware No Drawing. Application January 15, 1952, Serial No. 266,603

4 Claims. (Cl. 260—314.5)

This invention relates to an improved process for manufacturing copper phthalocyanine. More particularly this invention relates to the manufacture of copper phthalocyanine by the so-called "urea process," and to an improved method of recovery of the color from its reaction mass.

The urea-process of preparing certain metal phthalocyanines was first described by Max Wyler in U. S. Patent 2,197,458. The process consists essentially of heating phthalic anhydride, phthalimide or some other related compound with the corresponding metal chloride, for instance anhydrous cupric chloride, and a sufficient quantity of urea to produce a melt. Recovery is effected by extracting the cooled, solid reaction mass successively with dilute aqueous alkali and dilute aqueous acid.

In U. S. Patent 2,214,477, Albert Riley offered an improvement upon the above process, consisting essentially of adding certain "ancillary agents" or catalysts, particularly molybdates, for instance ammonium molybdate. Otherwise, the synthesis and mode of recovery remained essentially unchanged.

It has been discovered since the date of these pioneers that the economy of the process can be greatly improved by adding a solvent to the reaction mass, for instance trichlorobenzene. Such improvement, however, requires instantly an economical and efficient method for recovery of both pigment and solvent.

It is accordingly an object of this invention to provide an efficient method for recovering both pigment and solvent in the aforementioned urea-process of synthesizing copper phthalocyanine from phthalic anhydride and cupric chloride using trichlorobenzene as solvent. A particular object is to provide a method as aforementioned which is free of foaming troubles, and which will recover both solvent and pigment in highest yields. A further object is to provide a process as aforesaid, which will yield pigment of a very high order of purity. Various additional objects and achievements will appear as the description proceeds.

Now, essentially my invention consists of the following steps:

Copper phthalocyanine is synthesized by heating together, at a temperature of about 195° C. to 200° C., a mixture of phthalic anhydride, anhydrous cupric chloride, urea, trichlorobenzene, and a catalyst such as ammonium molybdate. The liquid reaction mass is then treated directly, that is without filtration, with an aqueous solution of an alkali-metal hydroxide. The treatment is effected by agitating the two liquid phases jointly at elevated temperature, say at between 50° C. and 105° C. Then, after allowing the mass to separate into layers, the aqueous alkaline layer is decanted, and the mass is agitated with hot water, at least once, to extract as much alkali as conveniently possible from the organic layer. The aqueous layer is decanted after each such treatment, and ultimately the washed organic layer is subjected to steam distillation. The chlorobenzene is recovered in the condensate, while the aqueous suspension of pigment which constitutes the residual mass in the still is filtered to yield the color.

Several important effects are achieved together by the above system of treatment. Thus—

1. Chloride ions which could develop acidity during the steaming process are neutralized in the alkaline treatment and removed in the decantation and washing steps.

2. Alkali-soluble, residual initial materials or intermediate products, for instance phthalic anhydride or phthalic acid, are dissolved out by the alkali treatment and removed in the decantation and washing steps.

3. Foaming which otherwise persistently occurs during steam distillation, is reduced to a minimum or entirely eliminated.

4. Elimination of foaming, eliminates loss of pigment which is otherwise carried out of the equipment by the frequent "boiling over" of the foam.

5. As a result of items 1, 2 and 4, the pigment obtained is not only of highest quality but also of very high yield.

6. The trichlorobenzene is easily recovered from the distillate, by allowing the latter to settle into layers, and the recovered solvent is of sufficient purity for re-use in the same synthesis.

7. Superfluous filtrations are eliminated, and the handling of materials is reduced to a minimum.

Without limiting my invention, the following examples are given to illustrate my preferred mode of operation. Parts mentioned are by weight.

*Example 1*

A mixture of one hundred parts of phthalic anhydride, 23 parts of cupric chloride, 147 parts of urea and 0.25 part of ammonium molybdate was heated in 362 parts of trichlorobenzene at 200° C. for 4 hours and drowned in a solution of 35 parts of 100% sodium hydroxide and 370 parts of water.

Next, the above mixture was agitated and heated with live steam for one hour at 100° C. The aqueous caustic layer was separated from the oil. 290 parts additional water were added to the oil layer which was agitated and heated to 80° C. by means of steam. The water layer was then decanted from the oil layer. This addition of water and decantation was repeated three times. Finally, 290 parts of water were added and the batch subjected to an exhaustive steam distillation, removing essentially all of the trichlorobenzene. The residue was filtered and dried.

Example 2

Example 1 was repeated, except that a total of three water extractions and decantations were made instead of four, and 17.5 parts of 100% sodium hydroxide were employed instead of 35 parts.

Example 3

Example 1 was repeated, except that one water extraction-and-decantation was made instead of four.

Example 4

Example 1 was repeated, except that the mixture was drowned in water containing 37 parts of potassium hydroxide instead of 35 parts of sodium hydroxide.

Example 5

Example 2 was repeated, except that the mixture was drowned in water containing 47.5 parts of sodium hydroxide instead of 35 parts.

Example 6

Example 1 was repeated, except that the mixture was agitated and heated at 100° C. with live steam for three hours, instead of one hour, before extractions and decantations.

Example 7

Example 1 was repeated, except that 10 parts of 4 chlor phthalic acid and 90 parts of phthalic anhydride were used instead of 100 parts of phthalic anhydride.

It will be understood that the details of the above examples may be varied within the skill of those engaged in this art. Thus, sodium hydroxide is preferred as the alkali, purely on the basis of economy, but potassium hydroxide works equally well. The quantity of alkali should be not less than 0.2 part per part of pigment produced. Larger amounts, say up to 0.5 part of alkali per part of pigment may be employed, but inasmuch as the larger quantities offer no special advantage, economic reasons will suggest avoiding unduly large excesses.

The time and temperature of alkali treatment are not critical as to upper limits. The 105° C. mentioned is the temperature obtained automatically by passage of steam through the still. As the lower temperature limit, 50° C. is recommended, to insure complete neutralization of the mass and removal of alkali-soluble impurities.

At least one water-wash following the alkali extraction was found to be necessary to insure complete elimination of foaming troubles, but several such washes and decantations may be applied if desired.

The required agitation during the steps of alkaline and aqueous treatment is best achieved by bubbling live steam through the mass. In this fashion partial steam distillation of the solvent takes place concurrently with the said extraction treatments. Yet, foaming troubles will not generally arise until about 90% of the solvent has been distilled off. Therefore, it is recommended to complete the alkaline extraction and at least the first water-wash before 90% of the trichlorobenzene have been removed by steam distillation.

Although the invention has been illustrated primarily in conjunction with the manufacture of copper phthalocyanine or partially chlorinated copper phthalocyanine, it may also be applied to monochloro copper phthalocyanine or to any of its higher chlorination products. The foaming troubles mentioned are not so acute in the case of these chlorinated derivatives, but the advantages of improved purity of the product and simplicity of operation will nevertheless be obtained by this invention also in these cases.

I claim as my invention:

1. A process of recovering copper phthalocyanine from a reaction mass in which the same has been produced from phthalic anhydride, urea and cupric chloride in the presence of trichlorobenzene, which comprises extracting the fluid reaction mass with aqueous alkali-metal hydroxide, removing the aqueous phase, extracting the residual organic phase with water, at least once, again removing the aqueous phase, and eventually steam distilling the residual organic phase until all the trichlorobenzene has been distilled over.

2. A process as in claim 1, wherein the alkaline extraction is achieved by the aid of an aqueous solution containing a weight of alkali-metal hydroxide corresponding to not less than 0.2 times the estimated weight of pigment in the reaction mass, and wherein the extraction is effected at a temperature not less than 50° C.

3. A process as in claim 2, wherein the subsequent extraction with water is likewise effected at a temperature not less than 50° C.

4. A process as in claim 1, comprising the steps set forth in claim 1 and comprising the additional step of filtering the residual aqueous mass following steam-distillation to recover the pigment.

JOHN DENNY COMPTON.

References Cited in the file of this patent

UNITED STATES PATENTS

| Number | Name | Date |
|---|---|---|
| 2,471,794 | Sumner | May 31, 1949 |
| 2,485,168 | Rintelman | Oct. 18, 1949 |